May 16, 1961 F. C. REGGIO 2,984,066
ENGINE CONTROL DEVICE

Original Filed Dec. 15, 1941 2 Sheets-Sheet 1

INVENTOR.
F. C. Reggio

INVENTOR
F. C. Reggio

United States Patent Office 2,984,066
Patented May 16, 1961

2,984,066
ENGINE CONTROL DEVICE
Ferdinando Carlo Reggio, P.O. Box 692, Norwalk, Conn.
Original application Dec. 15, 1941, Ser. No. 423,001. Divided and this application Oct. 28, 1953, Ser. No. 388,893

7 Claims. (Cl. 60—13)

The present application is a division of my copending application Serial No. 423,001 filed December 15, 1941, now abandoned.

The invention relates to improvements in engine control or regulating devices and has particular reference to improved controls for automotive and aircraft powerplants.

An object of the invention is to provide a regulating device for automatically varying the power output of the engine or prime mover substantially as a preselected function of one or more engine operating conditions or other variable conditions affecting engine operation.

Another object is to provide a regulating device for automatically limiting the maximum engine output to a value dependent on at least one variable condition affecting the engine operation such as an engine operating temperature.

Another object is to provide a device for controlling the engine power output by automatically varying the engine fuel supply, or the induction or manifold air pressure in dependence upon preselected engine operative conditions and upon the adjustment of a manual control member.

An additional object is to provide an improved control for regulating the engine either directly from a manually adjustable control member or automatically in predetermined relation to preselected variables.

A further object is to provide an improved regulator for supercharged engines, or powerplants including an air compressor driven by an exhaust gas turbine, for controlling the operation thereof in predetermined relation to preselected operating variables.

A further object is to provide a control for regulating the temperature level of a thermal powerplant.

Other objects and advantages will be more particularly pointed out hereinafter or will become apparent as the description proceeds.

The drawings, in which there are diagrammatically illustrated suitable constructional arrangements for the purpose of disclosing the invention, are for purpose of illustration only and are not to be taken as limiting or restricting the scope of the invention.

In the drawings:

Figure 3 is a fragmentary modification of Figure 1.

Figure 2:
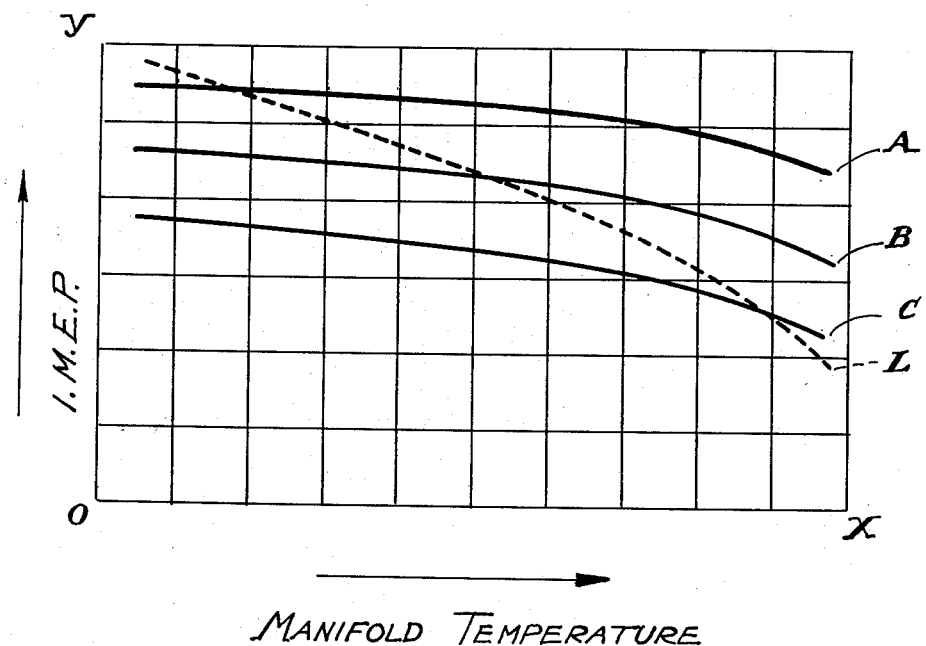
Figure 2 is an example of engine calibration curve.

The characteristic power calibration curves of an aircraft engine, represented in Figure 2, are referred to the axes of abscissae OX and ordinates OY representing the engine manifold temperature and the indicated mean effective pressure respectively. The values of said temperature and pressure increase in the direction indicated by the arrows.

The four curves of Figure 2 represent the result of actual engine tests conducted with a specified fuel, at a given value of engine speed and exhaust pressure. The curve A represents the engine indicated mean effective pressure developed under a constant value of manifold pressure for different values of manifold temperature. The slope of this curve shows a decrease of indicated M.E.P. (mean effective pressure) with increase in manifold temperature, which is due mainly to the corresponding reduction of density in the induction manifold. Curves B and C similarly show the indicated M.E.P. developed for two different lower constant values of manifold pressure. The dotted line L represents the upper limit for continuous operation, that is, the highest values of M.E.P. that can safely be developed by the engine under varying manifold temperature. It is apparent from the curve L that the maximum permissible value of the manifold pressure, and in turn the indicated M.E.P., falls as the manifold temperature rises.

In highly supercharged aircraft engines in which said temperature may vary within wide limits, engine regulators limiting the maximum engine torque or manifold pressure at a constant value have the disadvantage that they either limit the engine output at an unnecessarily low value under low manifold temperature, or overload the engine at elevated temperature, or both. Accordingly, one of the objects of the present invention is to provide a device for limiting the maximum engine output, or manifold pressure, or fuel flow, to a value varying substantially as a predetermined function of the manifold temperature.

Moreover, the upper safe limit for continuous operation varies upon changes of fuel characteristics and other engine operative conditions such as exhaust pressure, cylinder temperature, engine speed, surrounding atmospheric conditions. Thus a further object of the invention is to provide a regulator for varying the engine output, or the manifold pressure upon variation of one or more preselected variables as stated above.

While the curve L represents the upper safe limit for continuous operation, other similar curves may be determined corresponding to a maximum safe temporary engine overload, such as the upper limit for takeoff power, which is also generally found to be dependent upon engine operative conditions such as manifold temperature, exhaust pressure, etc. Accordingly, still another object is to provide a regulating device as outlined above, including a control member for selectively limiting the maximum engine output either at a safe value for continuous operation, or at a higher temporary value also variable upon changes of preselected variables. Moreover, the regulating device may be employed for automatically adjusting the engine output, or the manifold pressure, at values lower than those corresponding to the upper limit for continuous operation, as will be apparent from the following description.

Figure 1:
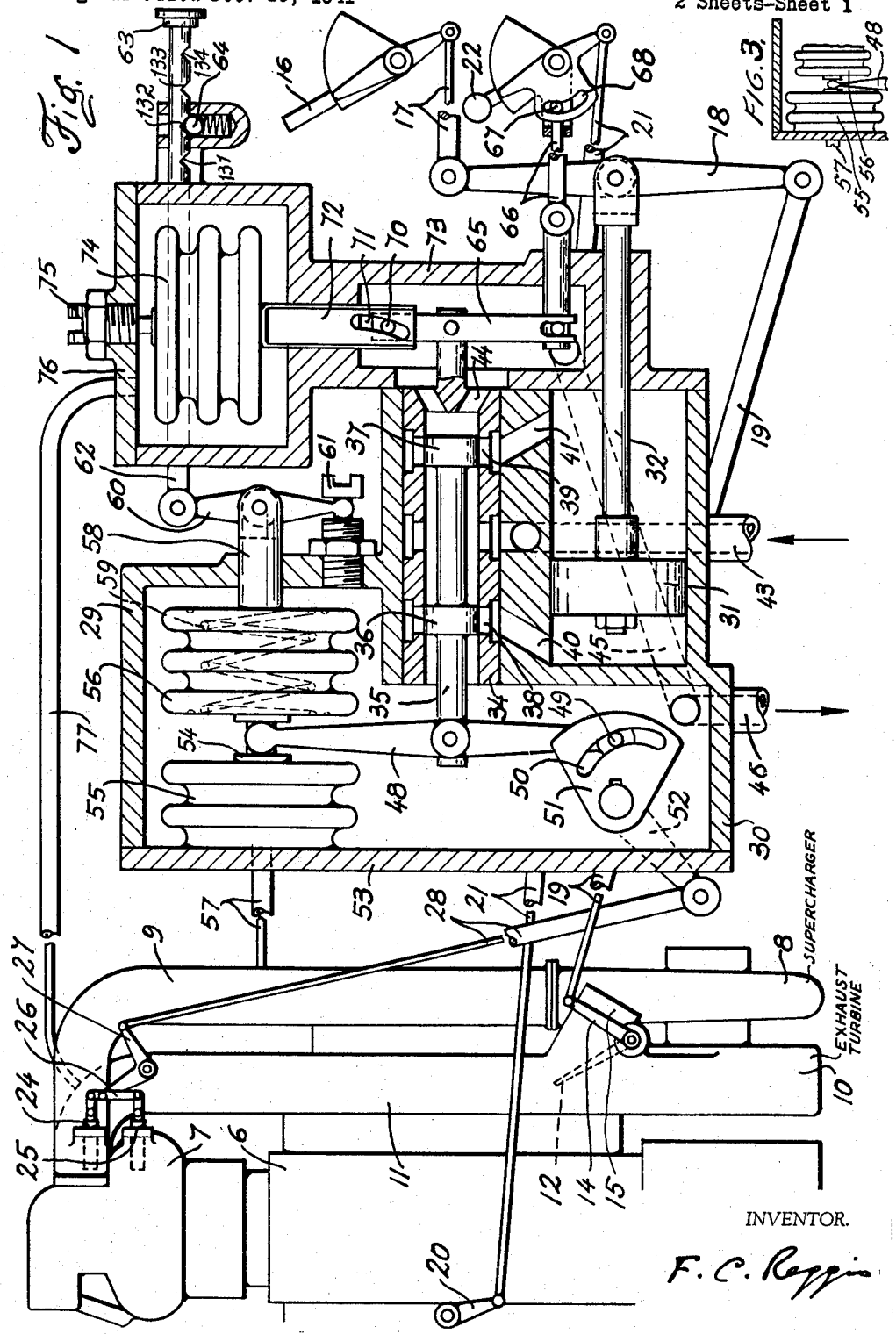
Figure 1 is a sectional view of an engine regulator and includes in reduced scale a diagrammatic illustration of an aircraft engine and control instrumentation therefor.

One form of the invention is illustrated in Figure 1 in combination with an engine such as an aircraft radial spark-ignition engine, although the invention is in no way limited in its applications to any particular form or type of engine. Such engine 6 has a cylinder 7 receiving air or combustible mixture from a blower or compressor or supercharger 8 by way of pipes or manifold 9 forming part of the engine induction system. The supercharger 8 is driven at variable speed by an exhaust turbine 10 connected by exhaust pipe 11 to the cylinder exhaust ports. The flow of exhaust gases to the turbine nozzles is regulated by a valve or waste gate 12. When the latter is rotated clockwise by means of an actuating lever 14 all exhaust gases from the engine will be delivered to the turbine, causing high speed operation thereof. On the other hand, when the valve 12 is rotated counter-clockwise, the exhaust gas is discharged through the duct 15 and the gas turbine becomes inoperative. At intermediate positions of the valve 12 more or less exhaust gas will be supplied to the turbine, and the speed thereof will assume corresponding intermediate values. A control member 16 is connected with the lever 14 by way of rod 17, lever 18 and rod 19 and may be employed directly to control the adjustment of the valve 12 and in turn the speed of the supercharger 8 and the pressure of the air or the combustible mixture delivered to the engine cylinders by way of conduit or manifold 9, hereinafter referred to as manifold pressure, compressor pressure or supercharged fluid pressure.

The engine 6 may drive a variable pitch propeller provided with a servo motor such as a hydraulic or electric motor controlled by an engine driven speed governor adjustable by means of lever 20, rod 21 and control member 22, for controlling the propeller pitch or blade angle thereof automatically to keep the engine speed constant at a value determined by the adjustment of the control member 22. Such variable pitch propeller and control mechanism therefor are not claimed in the instant case. They are described and illustrated in said application Serial No. 423,001. It will be appreciated, however, that the speed at which the propeller governor will automatically maintain the engine may be changed by varying the angular setting of the pilot's control lever 22 connected with lever 20, by means of which the speed adjustment of the propeller governor may be modified.

Two temperature responsive elements 24 and 25, the former connected to the manifold 9 and responsive to the temperature of the air or combustible mixture therein, hereinafter referred to also as manifold temperature or supercharged fluid temperature, and the latter responsive to the temperature of the engine cylinder or suitable part associated therewith, or to the coolant temperature in a liquid cooled engine, are connected by way of rods to the ends of a lever 26 rotatably carried at an intermediate point thereof by a bell-crank lever 27 for actuating a link or rod 28. An increase of temperature of either element rotates the lever 27 clockwise.

The engine regulating device, generally indicated at 29, may conveniently comprise a casing 30 having two parallel cylindrical chambers therein. Within one of said chambers there is disposed a reciprocable piston 31 attached to a rod 32 rotatably connected with a lever 18 at an intermediate point thereof. In the other cylinder there are mounted valve elements such as a reciprocable sleeve 34 provided with an axial cylindrical bore within which there is slidably mounted a plunger valve 35 having two spaced cylindrical discs or lands 36 and 37 for controlling ports 38 and 39 which are formed in the sleeve 34 and are so arranged as to be in permanent flow communication, by way of annular grooves formed in the sleeve 34 and ducts 40 and 41, with the cylinder chambers on either side of piston 31, respectively.

The annular chamber between lands 36 and 37 within the sleeve valve 34 is connected by way of suitable ports and line 43 with a source of pressure fluid, such as oil from the engine pressure lubricating system, while the two portions of the sleeve bore external to the discs 36 and 37 are maintained at relatively low pressure through the return lines 44, 45, 46 leading oil back to a reservoir or oil sump. The above outlined hydraulic servometer is a known device, and it will be readily understood that with the valve elements in relative neutral adjustment, with ports 38 and 39 closed as shown in Figure 1, the piston 31 is maintained stationary. Either a displacement toward the right of the plunger 35 or a movement to the left of the sleeve 34 causes the cylinder chamber on the left side of the piston 31 to be connected with the oil return line 46, while oil under pressure is admitted to the opposite side of the piston, thus displacing the latter to the left and determining clockwise rotation of lever 18 about its upper connection, and counter-clockwise rotation of valve 12. Opposite rotation of the latter is obviously determined by displacement of the plunger valve 35 toward the left or by movement of the sleeve 34 to the right.

The left end of the plunger valve 35 is connected with a lever 48 at an intermediate point thereof, while the lower end of said lever is provided with a pin 49 cooperating with a slot 50 formed in a disc or cam 51 keyed on the shaft carrying the lever 52, which is connected with the rod 28 actuated by the bell-crank lever 27. Thus the adjustment of the lower end of the lever 48 varies as a function of the temperature of the elements 24 and 25, said function depending upon the configuration of the slot 50. The upper end of the lever 48 is actuated by a member 54 secured to the movable walls of two diaphragm chambers or bellows 55 and 56. The former bellows is secured to the cover 53 of the housing 30, and the pressure within said bellows is kept by way of pipe 57 at the same value as in the engine induction system or manifold 9, while the bellows 596, provided with a calibrated spring 59 tending to expand it, is positioned by a member 58 slidably mounted in the wall of the housing 30. A lever 60, rotatably carried at an intermediate point thereof by member 58, is connected at its lower and upper ends with an adjusting member 61 and, by means of rod 62, with a manually adjustable member 63, respectively.

The adjustment of the upper end of lever 48 is thus dependent on the adjustment of member 63 and the engine manifold pressure. If the areas of bellows 55 and 56 are equal, changes of pressure within the housing 30 do not affect the adjustment of the lever 48, the latter being thus responsive to absolute manifold pressure. If one of the bellows has larger area than the other, as shown for instance in Figure 3, then an increase of pressure within the housing 30 will tend to contract said larger bellows, thus displacing the lever 48. Moreover, if bellows 56 is not highly evacuated, but contains a substantial mass of expansible fluid, then the adjustment of the lever 48 will also be affected by changes of temperature within the housing 30. In the preferred embodiment of the invention the pressure within the housing 30 is maintained substantially at surrounding atmospheric pressure by means of the oil drain line 46, and the temperature of the same housing 30 is also substantially the same as the surrounding ambient temperature.

The control member 63 may be provided with notches cooperating with a resiliently loaded detent 64. Four notches, 131 to 134, are indicated in Figure 1.

The sleeve 34 is actuated by a lever 65 which is connected at one end with a rod 66 terminating in a pin 67 cooperating with a slot 68 formed in the pilot's control member 22, whereby the adjustment of the sleeve 34 is dependent upon the setting of the control lever 22. The other end of the lever 65 carries a pin 70 cooperating with a slot 71 formed in a rod 72 slidably mounted in a bore of the housing 73 and connected with an evacuated, resiliently loaded bellows 74 supported by an adjustable member 75 carried by the housing cover 76 which closes the bellows chamber. The latter is maintained at exhaust pressure by means of a pipe 77 connected with the engine exhaust pipe 11. Thus a change of exhaust pressure determines a corresponding displacement of the sleeve 34 dependent upon the form of the slot or cam 71.

The operation of the regulating device may be substantially as follows: assuming the control member 63 to be set at maximum power for continuous operation, that is, with the detent 64 engaging the notch 132, the control lever 16 in fully open adjustment, and the power lever 22 set for the desired value of manifold pressure, then the valve 12, as shown in Figure 1, will be controlled by the hydraulic servo motor to maintain said manifold pressure at a certain value which varies as a preselected function of certain engine operating conditions as will presently be pointed out. A variation of manifold pressure, for example a drop thereof, determines contraction of bellows 55 and displacement of the plunger valve 35 to the left, thus setting the piston 31 in motion to rotate the valve 12 clockwise, accelerate the speed of the compressor or supercharger 8 and increase the manifold pressure until the initial value thereof is restored, whereupon the bellows 55 resumes its initial position and returns the plunger valve 35 to neutral adjustment with respect to the sleeve 34. If now the manifold temperature, or the cylinder temperature, or both vary, for instance rise, determining counter-clockwise rotation of the disc or cam 51, then the lower end of the lever 48 and the plunger valve 35 will be displaced to the right, causing counter-clockwise rotation of the valve 12 to reduce the supercharger speed and decrease the manifold pressure until the bellows 55 has collapsed the necessary amount to bring the plunger valve 35 back to neutral position. A lower manifold pressure is thus obtained corresponding to the higher manifold and/or cylinder temperature; and the form of the cam 51 may be so determined that the manifold pressure varies with the manifold temperature substantially as indicated, for instance, by the curve L of Figure 2. Similarly, either a variation of exhaust pressure causing expansion or contraction of bellows 74, an axial displacement of the rod 72 and corresponding displacement of the upper end of the lever 65, or a change in the adjustment of the pilot's control lever 22 causing a corresponding displacement of the lower end of the same lever, produce an axial displacement of the sleeve 34 which sets the piston 31 in motion to vary the manifold pressure until bellows 55 has expanded or contracted to the extent of bringing the plunger valve 35 again to neutral adjustment relative to the sleeve 34 in the new position of the latter. It is therefore clear that the manifold pressure is caused to vary as a predetermined function of manifold temperature, cylinder or other engine operating temperature, exhaust pressure, said function obviously depending upon or being determined by the form of the slots or cams 50, 71 and 68, or by equivalent devices which may be substituted for said cams.

As already stated, if the bellows 55 and 56 have different effective areas, the manifold pressure becomes dependent also upon the pressure in the housing 30, which may be the same as the surrounding air pressure or barometric pressure. Moreover, where the bellows 56 contains a certain mass of gas or other expansible fluid, then the manifold pressure is caused to vary with changes in the temperature of the bellows 56, which temperature may be substantially the same as the surrounding or entering air temperature.

The above automatic regulation occurs when the control lever 16 is in fully open adjustment, but at any time the pilot may rotate said lever counterclockwise for directly actuating the valve 12 to reduce the manifold pressure; and as long as such pressure is below the maximum preselected value corresponding to automatic operation, the bellows 55 remains contracted, with the plunger valve 35 to the left of its neutral position and the piston 31 stationary in its extreme right position, the adjustment of the valve 12 being thus determined by the adjustment of the control lever 16. The regulator however stands ready to resume control as the manifold pressure attains said maximum predetermined value. The same lever 16 may also be used to control the engine in the event of failure of the regulating device.

A displacement of the control member 63, for example toward the left, determines contraction of the bellows 56 and compression of the spring 59. The increased spring load in turn contracts the bellows 55, causing clockwise rotation of the valve 12 and thereby increasing the manifold pressure until the bellows 55 expands, against the increased load of the spring 59, the amount necessary to bring the plunger valve 35 back to neutral position. The regulating device will thus maintain higher manifold pressure, or higher indicated M.E.P., which may be represented in Figure 2 by a line substantially similar to the curve L but higher than the same. In the example shown in Figure 1 the control member 63, which actuates the lever 60 by means of rod 62, is provided with four notches, 131 to 134, arranged to cooperate with the resilient detent 64. The adjustment illustrated, with the notch 132 engaged by the detent, may correspond to engine operation up to maximum manifold pressure (or maximum M.E.P.) for continuous operation. When the control member 63 is moved all the way to the left so as to engage the detent with the notch 134, the regulator is set for maximum take-off power, which can safely be maintained only for very short time. The member 63 may be moved so as to engage the remaining notches 133 to 131; in the former case the regulator is set to permit temporary overload such as may be required for rapid climbing to high altitude, while in the latter case cruising power operation may be obtained, corresponding to minimum fuel consumption. The foregoing assumes, of course, that the control lever 16 is in fully open adjustment, and that the pilot's control lever 22 is suitably set to obtain the desired power output. That is to say, for a given adjustment of the condition control member 63 the actual engine power output may be controlled by varying the setting of the power lever 22, from the minimum values of manifold pressure (and engine speed) up to the limit of engine power determined by the actual setting of the member 63. It will be appreciated that the various parts of the mechanism may be so designed as to obtain automatically various and different results under different conditions. Thus, when the condition control member 63 is set for cruising power, the portions of the connections between the various elements of the regulating device, such as the cams 50, 71 and 68, which are effective during cruising operation, may be so designed as to coordinate the various parameter so as to obtain maximum fuel economy. On the other hand, when the condition member 63 is set, for instance, for take-off power, the various portions of the cams and other connections then effective will preferably be designed so as to obtain maximum performance irrespective of specific fuel consumption.

Fuels of higher antiknock rating have corresponding curves of maximum power for continuous output which are higher than the line L of Figure 2 and often have smaller slope at high manifold temperature. The regulating device of Figure 1 may be adjusted for such fuels by suitably adjusting the element or screw 61, the element 75, or both.

It will be appreciated that the actual operation of the regulator may be initiated and governed by any of the various condition-selecting elements or condition-responsive elements, the control of the engine shifting automatically from one regime to another so as to regulate whichever condition happens to be most critical under the existing set of operating conditions. For example, when the engine operating temperatures are well within safe limits, the engine manifold air pressure is so regulated as to maintain whichever value of said pressure has been selected by the pilot through the setting of the condition member 63 and the power lever 22, the basic regulating element being then the manifold pressure bellows 55. If however the engine operating temperature increases and approaches or attains certain predetermined safe limits, then the temperature sensing element 24, or the element 25, or both take over and decrease the manifold pressure and consequently the power output of the engine so as to protect the same against operation outside its safe limits of temperature. But as soon as the conditions which brought about the higher engine temperatures subside and the element 24 or 25 senses a drop in temperature, the basic regulating of manifold pressure reverts automatically to the bellows 55 to restore the full value of power corresponding to the setting of the pilot's controls. Of course, similar automatic shifts from one regime to another also take place in the other controls disclosed, for the purpose and with the effect of securing automatically full utilization of the permissible power safely obtainable under each operating condition, while protecting the powerplant against operation beyond its safe ratings.

While particular mechanical embodiments have been somewhat diagrammatically illustrated for the purpose of disclosing the invention, it is to be understood that the invention is not limited to the arrangements so specifically illustrated and described. Moreover, it is to be expressly understood that the invention may be used in various ways, and that modifications, substitutions, additions and omissions may be resorted to in the character, construction, arrangement, manner of operation and number of the various elements and parts within the limits or scope of the invention as defined in the appended claims.

In interpreting the claims, where they are directed to less than all of the elements of the complete system disclosed, they are to be construed as covering possible use of the recited elements in installations which lack the non-recited elements.

I claim:

1. An engine turbo-supercharger control mechanism including first control means manually actuatable to control said supercharger, a servo motor operating on said first control means, supercharged fluid pressure responsive means for actuating said servo motor to limit the degree of supercharging obtainable with said first control means, second control means manually actuatable for changing the operative setting of said pressure responsive means to vary the limit of said degree of supercharging, and engine exhaust pressure responsive means and engine operative temperature responsive means operatively connected with said servo motor to alter said limit with changes of engine exhaust pressure and lower said limit for high values of said temperature.

2. In a regulating system for the turbo-compressor of a thermal powerplant, the combination of valve means for regulating the speed of said turbo-compressor, control means for variably positioning said valve means, first temperature responsive means arranged to sense variations of surrounding air temperature and operatively connected to said control means for varying the speed of the turbo-compressor as a preselected function of said air temperature, second temperature responsive means adapted for connection with the powerplant to sense variations of a temperature therein resulting from combustion and operatively connected to said control means for adjusting the turbo-compressor speed so as to prevent excessive temperature in the powerplant, selector means operatively connected to said temperature responsive means for varying powerplant temperature, and additional adjusting means operatively connected to calibrate the setting of said temperature responsive means.

3. In a temperature regulating system for a thermal powerplant having a turbo-compressor and regulating means for controlling the speed of the turbo-compressor, the combination of a first control member operatively connected to said regulating means for selecting the desired powerplant temperature, first temperature sensing means responsive to change of air temperature on the discharge side of the compressor and operatively connected to said regulating means for varying the speed of the turbo-compressor with changes of said air temperature and second temperature responsive means responsive to variations of a powerplant temperature resulting from combustion and operatively connected to said regulating means for varying the speed of the turbo-compressor so as to limit the maximum temperature level of the powerplant to preselected values, and a second control member for modifying the effect of said temperature responsive means to vary the maximum temperature level of the powerplant.

4. In a temperature regulating system for an engine including a turbo-supercharger and valve means for regulating the speed of the turbo-supercharger, the combination of an automatic control device responsive to an engine temperature resulting from combustion connected to said valve means for positioning the same in response to changes in said engine temperature for limiting said temperature to a maximum desired value, calibrating means for initially adjusting the setting of said automatic control device, first manually operable control means operatively connected to said device for variably selecting the maximum limit of engine temperature, and second manual control means for changing the maximum temperature limit obtainable with said first manually operable control means without altering the setting thereof.

5. In apparatus for controlling the pressure in the air intake system of an engine having a variable speed air compressor, the combination comprising an automatic compressor speed controller including compressor discharge pressure responsive means for causing said compressor to operate at a speed that will produce a selected pressure in said intake system, calibrating means for adjusting the setting of said pressure responsive means, first manual control means operatively connected with said pressure responsive means for selecting the pressure to be maintained in said intake system, second manually operable means for varying the maximum limit of said pressure which may be obtained by said first manual means without altering the setting and the range of movement of said first manual means, and temperature responsive means for modifying the pressure in said intake system without changing the setting of said manually operable means.

6. Control apparatus for an engine turbo-supercharger, comprising in combination, motor means for variably positioning a turbo-supercharger speed controlling device, first pressure responsive means for sensing pressure variations on the discharge side of the supercharger to control the motor means, a selector device connected with said first pressure responsive means for varying the datum thereof to select the pressure to be maintained by said turbo-supercharger, additional adjusting means for varying the setting of said pressure responsive means to secure the desired calibration of the apparatus, barometric means responsive to variations of atmospheric pressure operatively connected with said first pressure responsive means for varying the effect thereof on the motor means to alter the pressure maintained by the supercharger upon changes of atmospheric pressure, first temperature responsive means sensing variations of engine operating temperature resulting from combustion and second temperature responsive means sensing changes of air temperature on the discharge side of said supercharger, an operative connection including cam means between said first and second temperature responsive means and said first pressure responsive means for varying the effect of said first pressure responsive means on said motor means to modify the pressure maintained by the supercharger upon changes of either temperature, and means responsive to engine exhaust temperature for varying the effect of said first pressure responsive means on said motor means to vary the pressure maintained by the supercharger upon changes of exhaust pressure.

7. In temperature regulating apparatus for a thermal powerplant having a turbo-compressor, the combination with means for controlling the speed of the turbo-compressor, of motor means for automatically actuating said speed control means, temperature responsive means sensing variations of a temperature of the powerplant resulting from combustion, means for connecting said temperature responsive means with said motor means and operable to vary the speed of the turbo-compressor to keep said powerplant temperature from exceeding preselected maximum limits, means responsive to compressor discharge pressure for altering the effect of said temperature responsive means in the direction to lower the maximum limit of said powerplant temperature as a function of increasing compressor discharge pressure, a first temperature selector operatively connected with said temperature responsive means for altering the datum of said temperature responsive means to vary the maximum limit of said powerplant temperature, and additional adjusting means for varying the calibration of said temperature and pressure responsive means.

References Cited in the file of this patent

UNITED STATES PATENTS

| | | |
|---|---|---|
| 1,375,931 | Rateau | Apr. 26, 1921 |
| 1,476,418 | Rice | Dec. 4, 1923 |
| 2,024,202 | Berger | Dec. 17, 1935 |
| 2,082,397 | Hiscock | June 1, 1937 |
| 2,088,954 | Gregg | Aug. 3, 1937 |
| 2,179,628 | Heinzelmann | Nov. 14, 1939 |
| 2,205,354 | Gregg et al. | June 18, 1940 |
| 2,216,699 | Berger | Oct. 1, 1940 |
| 2,219,994 | Jung | Oct. 29, 1940 |
| 2,233,307 | Dodson | Feb. 25, 1941 |
| 2,247,151 | Clarke | June 24, 1941 |
| 2,281,987 | Oswald | May 5, 1942 |
| 2,283,175 | Berger | May 19, 1942 |
| 2,285,344 | Marples et al. | June 2, 1942 |
| 2,305,810 | Muller | Dec. 22, 1942 |
| 2,306,277 | Oswald | Dec. 22, 1942 |
| 2,373,139 | Morris | Apr. 10, 1945 |
| 2,403,398 | Reggio | July 2, 1946 |
| 2,403,399 | Reggio | July 2, 1946 |
| 2,480,621 | Warner | Aug. 30, 1949 |
| 2,560,210 | Browne | July 10, 1951 |
| 2,581,334 | Reggio | Jan. 1, 1952 |

FOREIGN PATENTS

| | | |
|---|---|---|
| 801,587 | France | May 23, 1936 |
| 458,350 | Great Britain | Dec. 17, 1936 |